United States Patent
Chu

(10) Patent No.: US 6,609,440 B1
(45) Date of Patent: Aug. 26, 2003

(54) STRUCTURE OF A VARIABLE TRANSMISSION DEVICE

(76) Inventor: Chu-Wen Chu, P.O. Box 697, Feng-Yuan City 420 (TW)

(*) Notice: Subject to any disclaimer, the term of this patent is extended or adjusted under 35 U.S.C. 154(b) by 1 day.

(21) Appl. No.: 10/092,561

(22) Filed: Mar. 8, 2002

(51) Int. Cl.[7] .............................. B60K 3/02; F16H 3/02
(52) U.S. Cl. ........................ 74/810.1; 74/321; 74/393; 74/424.5; 74/425.5
(58) Field of Search ............................ 74/810.1, 810.2, 74/318, 319, 321, 392, 393, 395, 401, 424.5, 425, 425.5

(56) References Cited

U.S. PATENT DOCUMENTS

| | | | |
|---|---|---|---|
| 3,688,880 A | * 9/1972 | Lewis | 192/215 |
| 4,272,914 A | * 6/1981 | Orenstein | 446/435 |
| 4,759,233 A | * 7/1988 | Woodbridge | 475/232 |
| 5,159,854 A | * 11/1992 | Mino et al. | 74/810.1 |
| 5,765,440 A | * 6/1998 | Yang | 74/427 |
| 6,296,589 B1 | * 10/2001 | Ni | 475/221 |
| 6,484,608 B1 | * 11/2002 | Ziavras | 74/810.1 |

FOREIGN PATENT DOCUMENTS

JP           1047444 A    * 2/1998           F16H/3/22

* cited by examiner

*Primary Examiner*—Sherry Estremsky
*Assistant Examiner*—Tisha D. Lewis

(57) ABSTRACT

A structure of a variable transmission device includes an input shaft driven by a motor to perform alternate rotation having a gear on a middle portion, an output shaft having a pair of gears secured to the upper and lower ends respectively and a speed changing shaft positioned between the input and output shaft having a pair of gears rotatably secured to two ends respectively meshed with the gears of the output shaft and a spiral outer periphery on a middle portion rotatably and slidably engaged with an inner threaded gear which meshes with the teeth of the gear of the input shaft. Thereby, the rotation of the input shaft drives the inner threaded gear to rotatably slide about the spiral outer periphery to force the gears of the speed changing shaft to rotate and in turn to drive the gears of the output shaft to rotate in concert with the input shaft.

3 Claims, 3 Drawing Sheets

STRUCTURE OF A VARIABLE TRANSMISSION DEVICE

BACKGROUND OF THE INVENTION

The present invention relates to speed changing machines and more particularly to a structure of a variable transmission device which can rapidly and strictly change the speed.

Typical variable transmission device adapts a frequency converter to change the speed. The frequency converter connects a lot of electrical circuit which makes the structure more complicated and often breakdown. If one discards the frequency converter and replaces with a mechanical structure, the variable transmission device will become more practical and reliable.

SUMMARY OF THE PRESENT INVENTION

The present invention has a main object to provide a structure of a variable transmission device which can rapidly and accurately change the rotation speed of an output shaft without using a frequency converter and complicated electric circuit.

Another object of the present invention is to provide a structure of a variable transmission device which has both the functions of speed acceleration and speed changing so as to adapt to different type of machinery.

Accordingly, the structure of a variable transmission device of the present invention comprises generally an input. shaft driven by a motor to perform both positive and reverse rotations, an output shaft having gears at upper and lower ends for driving a working object to rotate and a speed changing shaft between the input shaft and the output shaft having gears at upper and lower ends meshed to the gears of the input shaft. The gears of the speed changing shaft are connected with bearings therebetween so that they can be rotated freely. Further, the speed changing shaft has a spiral outer periphery engaged with a inner threaded gear which is driven by a gear at the middle of the input shaft to rotatably slide in turn to the upper most position or the lower most position of the spiral outer periphery of the speed changing shaft. Because of that the input shaft rotates clockwise or counter clock wise over and over again, the inner threaded gear will repeatedly slide up and down. When the inner threaded gear reaches to the upper or lower gear of the speed changing shaft to closely engage with the upper or lower gears of the speed changing shaft the gears will be rotated at full speed as that of the input shaft. When the inner threaded gear leaves the upper or the lower gear of the speed changing shaft, it will slow down and gradually change the rotation direction. Therefore, the output shaft which is driven by the speed changing shaft is rotated at different speed ratio and different directions.

The present invention will become more fully understood by reference to the following detailed description thereof when read in conjunction with the attached drawings.

DETAILED DESCRIPTION OF THE PREFERRED EMBODIMENT

Figure 1:
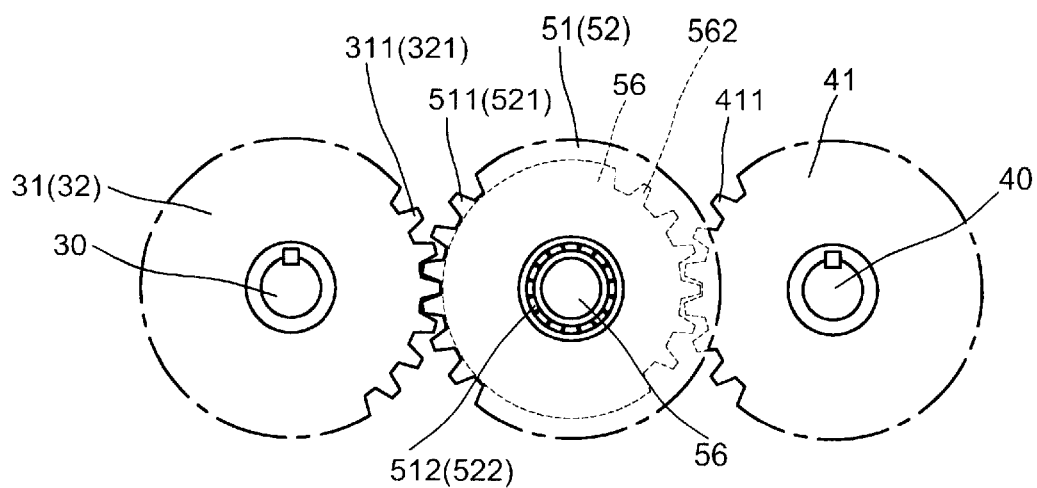
FIG. 1 is a top view to show the structure of a variable transmission device of the preferred embodiment of the present invention.
Figure 2:
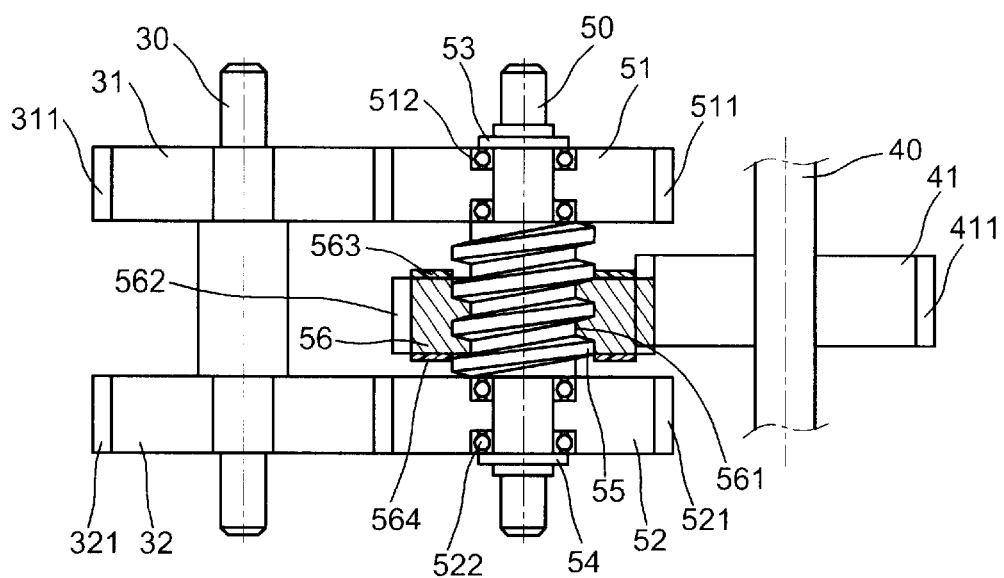
FIG. 2 is an elevational view with partially sectional view of FIG. 1.

With reference to FIGS. 1 and 2 of the drawings, the structure of a variable transmission device of the present invention comprises generally an output shaft 30, an input shaft and a speed changing shaft 50 engaged between the output shaft 30 and the input shaft 40.

The output shaft 30 which is indirectly driven by the input shaft 40 via the speed changing shaft 50 has an upper gear 31 and a lower gear 32 fixedly secured to the upper and lower ends respectively and each includes a plurality of teeth 311 and 321 around outer periphery.

The input shaft is driven by a motor (not shown) to perform repeatedly clockwise and counter-clockwise rotations and has a gear 41 fixedly secured to a middle portion including a plurality of teeth 411 around outer periphery.

The speed changing shaft 50 has an upper gear 51 and a lower gear 52 rotatably secured to the upper and lower ends with bearings 512 and 522 engaged therebetween so that the gears 51 and 52 can be rotated freely on the speed changing shaft 50 and each has a plurality of teeth 511 and 521 therearound respectively meshed with teeth 311 and 321 of the upper and lower gears 31 and 32 of the output shaft 30, a pair of retaining rings 53 and 54 respectively secured to the outer surfaces of the upper and lower gears 51 and 52 to prevent them from moving further up or downward, a spiral outer periphery 55 between the upper and lower gears 51 and 52 to engage with an inner threaded gear 56 which has inner thread 561 meshed with spiral outer periphery 55, a plurality of teeth meshed with teeth 411 of the gear 41 of the input shaft 40 and a pair of contacting surfaces 563 and 564 respectively positioned on the top and the bottom.

Figure 3:
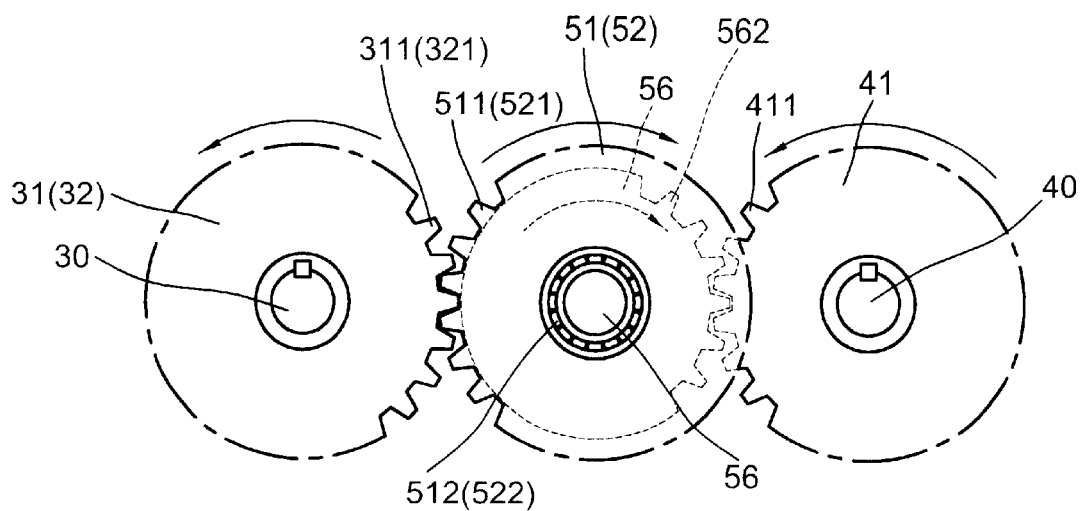
FIG. 3 is a top view to show that an inner threaded gear of a speed changing shaft is sliding to an upper most position.
Figure 4:
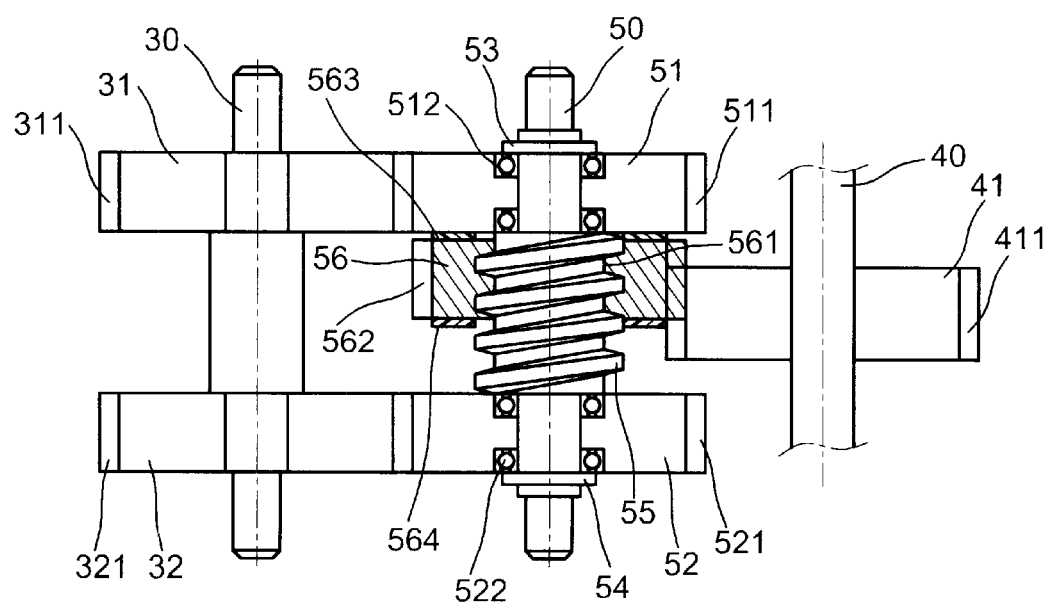
FIG. 4 is an elevational view with partially sectional view of FIG. 3.

Referring to FIGS. 3 and 4, when the input shaft is rotated counterclockwise, the gear 41 drives the inner threaded gear 56 to rotate clockwise and to slide upward until the contacting surface 563 pressedly contacts the inner surface of the upper gear 51 of the speed changing shaft 50 to frictionally force the upper gear 51 together with the speed changing shaft 50 to rotate in concert with the inner threaded gear 56. The more upwards of the inner threaded gear 56, the result is more good. The upper gear 31 of the output shaft 30 is driven by the upper gear 51 to rotate counterclockwise in the same speed. Since the teeth member of the upper gear 51 and the lower gear 52 of the speed changing shaft 50 may be equal to or more than that of the upper gear 31 and lower gear 32 of the output shaft 30, the rotation speed of the output shaft would be equal to or faster than that of the input shaft 40.

Figure 5:
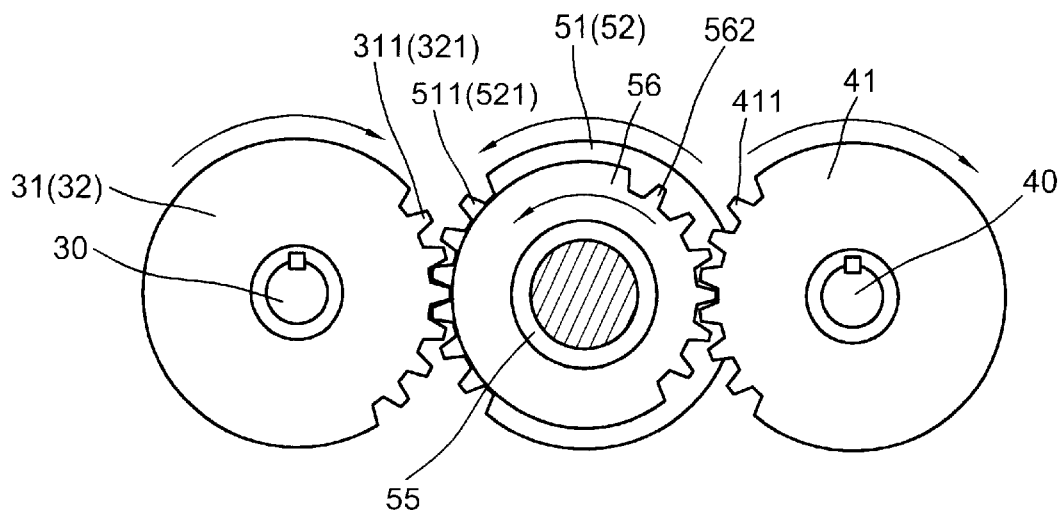
FIG. 5 is a top view with partially sectional view to show that the inner threaded gear of the speed changing shaft is sliding to a lower most position.
Figure 6:
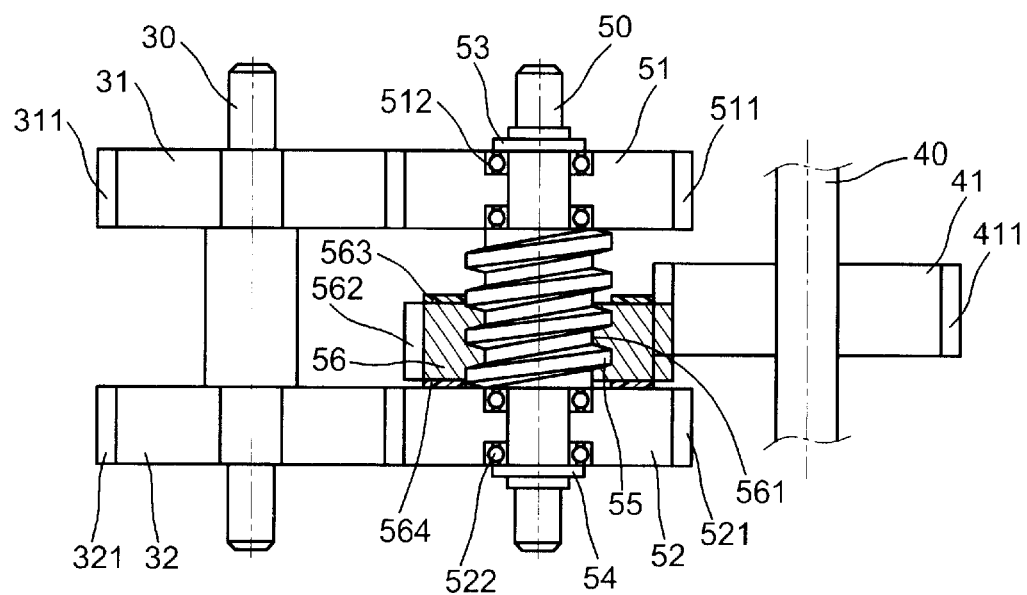
FIG. 6 is an elevational view with partially sectional view of FIG. 5.

Referring to FIGS. 5 and 6, when the input shaft 40 rotates clockwise, the inner threaded gear 56 is driven by the gear 41 to rotate counterclockwise and to slide downward to gradually leave the upper gear 51 of the speed changing shaft 50. However, the upper gear 51 is still rotated clockwise inertially but gradually slow down together with the upper gear 31 of the output shaft 30. When the contacting surface 564 of the inner thread gear 56 pressedly contacts the top of the lower gear 52 and frictionally forces the gear 52 together with the speed changing shaft 50 to rotate counterclockwise at the speed equal to that of the input shaft 40, the lower gear 32 of the output shaft 30 is first slow down and then rotated clockwise at the speed equal to that of the input shaft 40. So that this device is suitable to such machinery for slow feed and swift withdrawal.

The structure of a variable transmission device of the present invention has speed changing function and acts swift and exact which suits to the machinery requiring reverse rotation after the changing of speed or the function of speed acceleration and different speed ratio during alternate transmission. Therefore, it promotes the production efficiency and is better than the conventional electro-magnetic or the frequency converter speed changing machines.

Further, the diameter as well as the teeth number of the upper and lower gears 51 and 52 of the speed changing shaft 50 may equal to and/or larger than that of the upper and lower gears 31 and 32 of the output shaft 30 in order to change the rotation speed of the output shaft 30. Besides, except the mesh of the teeth, the structure of this device may modified by using chains and belts which can achieve the same function.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A structure of a variable transmission device comprising:

an input shaft driven by a motor to perform clockwise and counterclockwise rotations and having a circular transmitting means secured to a middle portion thereof including a plurality of teeth therearound;

an output shaft having a first upper circular transmitting means and a first lower circular transmitting means respectively secured to two ends thereof each including a plurality of teeth therearound;

a speed changing shaft positioned between said input shaft and said output shaft and having a second upper circular transmitting means and a second lower circular transmitting means respectively and rotatably secured to two ends thereof with bearings engaged therebetween each including a plurality of teeth therearound to respectively mesh with the teeth of the first upper and lower circular transmitting means of said output shaft, a spiral outer periphery on a middle portion of the speed changing shaft and an inner threaded circular transmitting means rotatably and slidably sleeved on the spiral outer periphery including inner threads engaged with the spiral outer periphery, a pair of contacting means on a top and bottom surface of the inner threaded circular transmitting means and a plurality of teeth therearound meshed with the teeth of the circular transmitting means of said input shaft;

whereby, the alternate rotation of said input shaft drives the inner threaded circular transmitting means to rotatably slide about the spiral outer periphery to force the second circular transmitting means to rotate and to drive the first circular transmitting means of said output shaft to rotate in concert with said input shaft.

2. The structure as recited in claim 1 wherein said circular transmitting means is a gear.

3. The structure as recited in claim 1 further has a pair of retaining rings respectively secured at two ends of said speed changing shaft.

\* \* \* \* \*